United States Patent
Truche et al.

(10) Patent No.: US 7,365,310 B2
(45) Date of Patent: Apr. 29, 2008

(54) INCREASED DEPTH OF FIELD FOR HIGH RESOLUTION IMAGING FOR A MATRIX-BASED ION SOURCE

(75) Inventors: Jean-Luc Truche, Loveland, CO (US); Gregor Overney, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 263 days.

(21) Appl. No.: 11/168,612

(22) Filed: Jun. 27, 2005

(65) Prior Publication Data

US 2006/0289734 A1 Dec. 28, 2006

(51) Int. Cl.
*H01J 49/10* (2006.01)

(52) U.S. Cl. ............ 250/282; 250/281; 250/201.8; 250/559.04; 250/559.05; 250/559.08; 250/288

(58) Field of Classification Search ............ 250/281, 250/282, 201.8, 559.04, 559.08, 559.19, 250/559.29, 559.36, 206.1, 227.31, 568, 250/559.05
See application file for complete search history.

(56) References Cited

U.S. PATENT DOCUMENTS

| | | | |
|---|---|---|---|
| 4,498,843 A | 2/1985 | Schneider et al. | |
| 4,661,986 A | 4/1987 | Adelson | |
| 5,541,411 A * | 7/1996 | Lindquist et al. | 250/309 |
| 6,011,876 A | 1/2000 | Kishner | |
| 6,201,899 B1 * | 3/2001 | Bergen | 382/284 |
| 6,320,979 B1 | 11/2001 | Melen | |
| 6,453,063 B1 * | 9/2002 | Phaneuf et al. | 382/145 |
| 6,898,331 B2 * | 5/2005 | Tiana | 382/274 |
| 7,034,296 B2 * | 4/2006 | Sato et al. | 250/307 |
| 7,064,318 B2 * | 6/2006 | Bui | 250/282 |
| 7,120,286 B2 * | 10/2006 | Yu et al. | 382/145 |
| 2002/0008211 A1 | 1/2002 | Kask | |
| 2002/0181762 A1 | 12/2002 | Silber | |
| 2002/0191864 A1 | 12/2002 | Lennon et al. | |
| 2003/0010907 A1 | 1/2003 | Hayek et al. | |
| 2003/0096433 A1 | 5/2003 | Meyer-Almes | |

OTHER PUBLICATIONS

Adelson et al. "Pyramid Methods in Image Processing," RCA Engineer 29-9 Nov./Dec. 1984.
Ogden et al. "Pyramid-Based Computer Graphics," RCA Engineer 30-5 Sep./Oct. 1985.

* cited by examiner

*Primary Examiner*—Jack I. Berman
*Assistant Examiner*—Michael J Logie

(57) ABSTRACT

The invention provides a method of producing an in-focus image of an area on a sample plate for an ion source, e.g., a matrix-based ion source or any other type of ion source that employs a sample plate onto which samples are deposited. The method generally includes: a) positioning an area of the sample plate in the field of view of an imaging device; b) producing a plurality of images of the area having different in-focus regions; and c) generating an in-focus image of the area using the plurality of images. The in-focus image may be two-dimensional or three-dimensional. Systems and programming for performing the methods are also provided.

27 Claims, 8 Drawing Sheets

Fig. 8A
Fig. 8B
Fig. 8C
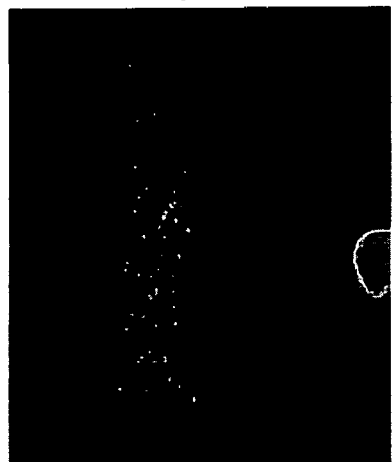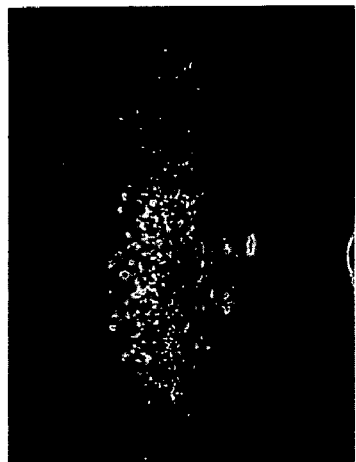
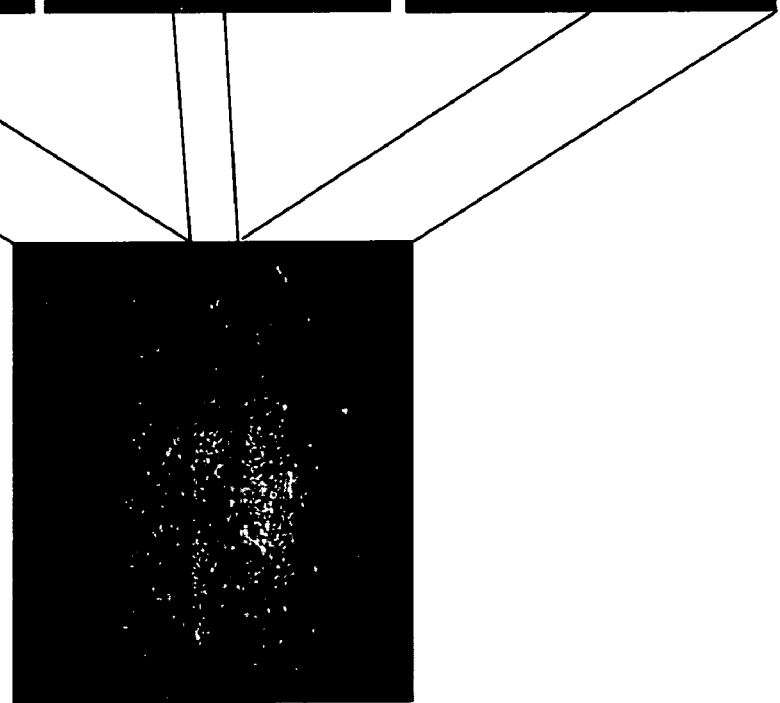
Fig. 8D

INCREASED DEPTH OF FIELD FOR HIGH RESOLUTION IMAGING FOR A MATRIX-BASED ION SOURCE

BACKGROUND

Mass spectrometry is an analytical methodology used for qualitative and quantitative determination of compounds in chemical and biological samples. Analytes in a sample are ionized, separated according to their mass by a spectrometer and detected to produce a mass spectrum. The mass spectrum provides information about the masses and in some cases the quantities of the various analytes that make up the sample. In particular embodiments, mass spectrometry can be used to determine the molecular weight or the molecular structure of an analyte in a sample. Because mass spectrometry is fast, specific and sensitive, mass spectrometer devices have been widely used for the rapid identification and characterization of biological analytes.

During the last few years, matrix-based ionization methods, e.g., matrix-assisted laser desorption/ionization (MALDI) methods have proven to be valuable for the ionization of samples, and have found widespread use in a variety of fields such as genomics and proteomics. In performing matrix-based methods, a sample is combined with an organic matrix that co-crystallizes with the sample, and then deposited upon a sample plate. The sample plate is placed in an ion source, and an energy source, e.g., a laser beam vaporizes the sample. During vaporization of the sample, analyte ions are formed. It is thought that the presence of the matrix enables the analyte to be ionized, solving a problem of other methods.

In many cases, matrix-based ion sources are integrated with an analytical device, e.g., a mass spectrometer, for studying the ionized analyte. For the most part, time-of-flight mass spectrometers ("TOF-MS") are used for this purpose, however a variety of other mass spectrometers may also be used, including an ion cyclotron resonance spectrometer (e.g., a Fourier transform ion cyclotron mass resonance spectrometer), an ion trap mass spectrometer (e.g., a high-frequency quadrupole ion trap mass spectrometer), or a hybrid instrument (e.g., a quadrupole/time-of-flight mass spectrometer, or Q-TOF).

In ionizing a sample using matrix-based ionization methods, it is generally desirable to view an area on a sample plate to ensure that a sample has been deposited onto that area, and to ensure that the laser is actually going to impact the sample. In particular, there is a need for an imaging system that provides a detailed image of the sample, in particular an image that shows areas of analyte crystals.

Prior art imaging systems are capable of capturing an image of a sample on a sample plate for a matrix-based ion source, and transferring such an image to a monitor so that the sample can be viewed. However, because of the optics employed in those imaging systems, they are generally limited because they do not produce a high resolution, high contrast image that is in-focus over the entire field of view, or at least an extended area of field of view.

For example, the production of a high resolution image of an area of a sample plate in a matrix-based ion source is challenging because, in general, the area cannot be viewed directly from above (i.e., from the z direction when the x and y directions are coplanar with the surface of the sample plate). In most cases, in producing an image of an area of a sample plate in a ion source, the area must be viewed from the side, at an angle that can vary greatly depending on the particular ion source and imaging system used. The production of a high resolution image using such a system is challenging because of limitations that are inherent to the imaging systems used.

A need still exits, therefore, for a new matrix-based sample plate imaging system. The present invention meets this need, and others.

SUMMARY OF THE INVENTION

The invention provides a method of producing an in-focus image of an area on a sample plate for an ion source. The method generally involves: a) positioning an area in a field of view of an imaging device; b) producing a plurality of images of the area having different in-focus regions; and c) generating an in-focus image of the area using the plurality of images. The in-focus image is generally a composite image containing in-focus regions of the plurality of images, and may be a two-dimensional or three-dimensional image. The plurality of images having different in-focus regions may be made using a number of methods, for example by moving the area in the plane of the sample plate, by altering the focus of the imaging device, or by a combination thereof. Systems and programming for performing the methods are provided. The invention finds use in a variety of analytical methods. For example, the invention finds use in chemical, environmental, forensic, food, pharmaceutical and biological research applications.

The invention described herein may be used to produce an in-focus, high-resolution image of a sample on the surface of a sample plate configured for use in an ion source. Areas of a sample that contain analyte-containing crystals may be identified using the invention. In certain embodiments, the sample plate may be moved in a matrix-based ion source so that the ionizing laser of the ion source impacts the analyte-containing crystals, facilitating the production of analyte ions.

The invention may be employed in any type of ion source that employs a sample plate onto which samples are deposited. Exemplary embodiments employing a sample plate for matrix-based ion source are described in greater detail below.

BRIEF DESCRIPTION OF THE DRAWINGS

FIGS. 8A-8D shows an example of the invention.

DEFINITIONS

Figure 1:
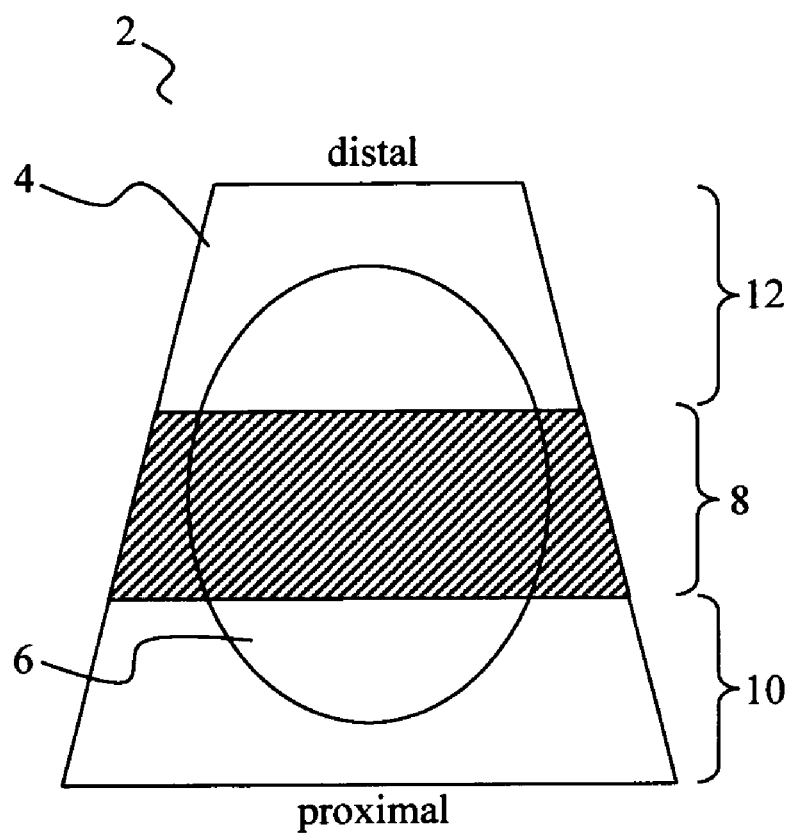
FIG. 1 schematically illustrates an area on a surface of a sample plate for an ion source, as captured by an imaging device that is at an angle with respect the surface of the sample plate.

Unless defined otherwise, all technical and scientific terms used herein have the same meaning as commonly understood by one of ordinary skill in the art to which this invention belongs. Still, certain elements are defined below for the sake of clarity and ease of reference.

The term "using" is used herein as it is conventionally used, and, as such, means employing, e.g. putting into service, a method or composition to attain an end. For example, if a program is used to create a file, a program is executed to make a file, the file usually being the output of the program. In another example, if a file is used, it is accessed, read, and the information stored in the file employed to attain an end.

An "ion source" is any apparatus that produces ions for analysis in a mass spectrometry system. Exemplary ion sources include electron impact (EI) and matrix-based ion sources, as well as others. An ion source may be operated at any ambient pressure (e.g., between about $10^{-8}$ Torr to about 2,500 Torr), where "ambient pressure" is the pressure within the enclosure of the ion source. The ambient pressure within an ion source may be any pressure above or below 100 mTorr, in the range of 100 mTorr to about 2,500 Torr or high vacuum (e.g., from about $10^{-8}$ Torr to about $10^{-4}$ Torr), including atmospheric pressure (approximately 760 Torr), for example. In other words, an ion source may be operated at atmospheric pressure, above-atmospheric pressure, or below atmospheric pressure.

The term "matrix-based ion source" refers to an ion source in which sample is combined with a matrix, generally an organic matrix, and deposited onto a sample plate prior to its ionization. A matrix-based ion sources does not rely on a volatile solvent for ionization. Exemplary matrix-based ion sources include fast atom bombardment (FAB) ion sources and matrix-assisted laser desorption ionization (MALDI) ion sources. The term "MALDI", as used herein, encompasses atmospheric pressure MALDI (AP-MALDI), as well as below atmospheric pressure MALDI (e.g., vacuum or intermediate pressure MALDI). Accordingly, a reference to a MALDI device, e.g., a MALDI ion source or a MALDI sample plate, indicates that device that is adapted for use with AP-MALDI or adapted for use with below atmospheric pressure MALDI (e.g., vacuum or intermediate vacuum MALDI) methods.

An "ion source sample plate" or "sample plate configured for use in an ion source" is a plate of samples suitable for use within an ion source of a mass spectrometry system. An ion source sample plate can be of any shape, e.g., circular, square, rectangular, oval, etc., and may be made from any material, e.g., any metal. Sample on the surface of an ion source sample plate is ionized in the ion source.

The term "adjacent" means, near, next to or adjoining. Something adjacent may also be in contact with another component, surround the other component, be spaced from the other component or contain a portion of the other component.

A "remote location," means a location other than the location at which a ion source is present. For example, a remote location could be another room in the same building, or another building in the same city, another location in a different city, another location in a different state, another location in a different country, etc. When one item is indicated as being "remote" from another, what is meant is that the two items may be in the same room but separated, or at least in different rooms or different buildings, and may be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. Examples of communicating media include radio or infra-red transmission channels as well as a network connection to another computer or networked device, and the Internet or Intranets including email transmissions and information recorded on websites and the like. A "plurality" is at least 2, e.g., 2, 3, 4, 6, 8, 10, 12 or greater than 12. The phrases "a plurality of" and "multiple" are used interchangeably. A plurality of elements contains at least a first element and a second elements.

The term "f-stop" refers to a measure of the size of the aperture of an imaging device. The higher the f-stop, the smaller the aperture.

An image that is a "combination" of other images is an image that is made up of at least one portion from each of two or more other images.

A "two dimensional image" is an image that may be described with reference to x and y coordinates. A two dimensional image is planar and has no depth.

A "three dimensional image" is an image that may be described with reference to x, y and z coordinates. Three dimensional images have depth and can be rotated in any dimension.

The term "positioning" indicates the movement of an object in any direction in one two or three dimensions. When a first object is positioned relative to a second object, the first object may be moved, the second object may be moved, or both objects may be moved.

DETAILED DESCRIPTION OF THE INVENTION

The invention provides a method of producing an in-focus image of an area on a sample plate for a matrix-based ion source. The method generally comprises: a) positioning an area in a field of view of an imaging device; b) producing a plurality of images of the area having different in-focus regions; and c) generating an in-focus image of the area using the plurality of images. The in-focus image is generally a composite image containing in-focus regions of the plurality of images, and may be a two-dimensional or three-dimensional image. The plurality of images having different in-focus regions may be made using a number of methods, for example by moving the area and the imaging device relative to each other in the plane of the sample plate, by altering the focus of the imaging device, or by a combination thereof. Systems and programming for performing the methods are provided. The invention finds use in a variety of analytical methods. For example, the invention finds use in chemical, environmental, forensic, food, pharmaceutical and biological research applications. The invention is particularly employable in MALDI (e.g., AP-MALDI) methods.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention.

The referenced items are provided solely for their disclosure prior to the filing date of the present application.

Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Methods for Producing an In-Focus Image of an Area of a Sample Plate

In an ideal set-up, the imaging system used to produce an image of an area of a sample plate for a matrix-based ion source should have an objective lens that is as open as possible (e.g., set to have a low f-stop number and hence a large numerical aperture) in order to provide maximal resolution. However, since the depth of field (DOF; i.e., the size of the in-focus region of an image) is inversely proportional to the square of the numerical aperture (i.e., conforms to the equation $DOF=\lambda/n^2$, where $\lambda$ is the wavelength of light and n is the numerical aperture of the lens used), an imaging system that employs an open objective lens usually has a very small depth of field. An illustration representing a typical image produced by a system having an open objective lens is shown in FIG. 1. With reference to FIG. 1, image 2 generally contains a field of view 4 containing an area of a sample plate 6. The field of view 4 contains three regions: an in-focus region 8, and two out of focus regions 10 and 12. The field of view 4 is shown with perspective and, as such, the area has a trapezoidal shape. Out-of-focus region 10 is proximal to the imaging device whereas out-of-focus region 12 is distal the to the imaging device. Accordingly, an image of an area of a sample plate produced using an imaging system that employs an open objective lens typically contains an in-focus region that is of high definition and contrast, and a significant amount of out-of-focus regions that are blurred. Such images are not generally suitable for identifying small structural features of a deposited sample, e.g., an area containing sample crystals, because those features may be present in an out-of-focus region of the image.

In contrast, an imaging system having an objective lens with its aperture as closed as possible (i.e., set at the highest f-stop) may be employed to produce an image of an area on a sample plate that is completely in focus over its entire field of view. However, because resolution is decreased by closing the objective lens, images produced by such a system are generally unsuitable for identifying small structural features. While the image produced by such a system may be entirely in focus, the image's resolution may be insufficiently low to identify such features.

With the foregoing discussion in mind, the methods described herein provide a means to produce an in-focus image of an area of a sample plate using an imaging system that may employ an open objective lens (e.g., an objective lens having an f-stop of about 1.0 to about 8.0, e.g., an f-stop of 1.0, 1.4, 2, 2.8, 4, 5.6 or 8, or an equivalent numerical aperture number, for example). The images produced are generally in focus (i.e., clear and sharp), and are of sufficiently high resolution and contrast to identify small features on the surface of the sample plate (e.g., areas containing analyte crystals). In certain embodiments, methods of the invention may be thought of as extending the depth of field of the imaging device, without closing the aperture of the imaging device.

Figure 2:
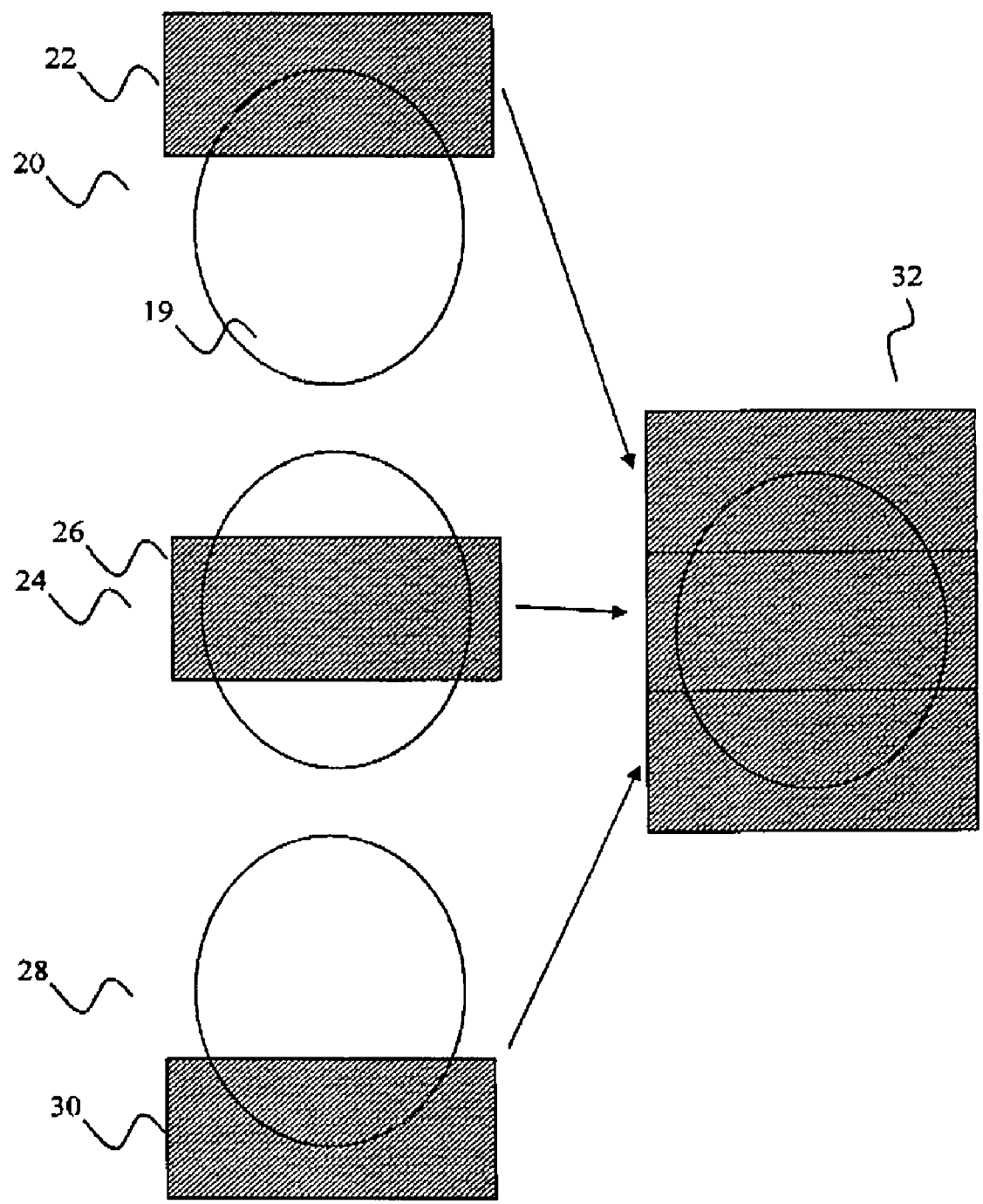
FIG. 2 schematically illustrates a first embodiment of the invention.

The general features of the inventive method are illustrated in FIG. 2. With reference to FIG. 2, the method generally involves producing a plurality of (i.e., at least two) images, e.g., images 20, 24 and 28, of area 19 of a MALDI sample plate. The produced images having different in-focus regions, e.g., in-focus regions 22, 26 and 30, that are combined to generate an in-focus image 32 of the area. The in-focus image 32 produced by the method is therefore a composite image containing in-focus regions of the plurality of images.

In general, the methods are performed using computer executable instructions, i.e., programming, that are executed by a processor of a computer. The computer executable instructions for performing the methods are generally present in a computer readable medium that may be separate to or operably connected with an ion source containing a sample plate imaging system. In other words, the computer executable instructions may be associated with an ion source, or not. This sample plate imaging system will be described in greater detail below.

Also as will be described in great detail below and depending on which particular method is employed, the in-focus image may be a high-resolution two-dimensional or a three-dimensional image, allowing features (e.g., analyte crystal-containing areas) to be readily identified in two-dimensional or three-dimensional space.

In performing the methods, the number of images produced generally depends on the size of the area to be imaged and the depth of field of the imaging system employed. Further, any number of images having different in-focus regions may be produced using the system and any number of the produced images may be combined to generate the in-focus image. For example, in certain embodiments, 2 or more, 3 or more, 4 or more, 5 or more, 10 or more, 50 or more, 100 or more, 500 or more, 1,000 or more or 10,000 or more images having different in-focus regions may be produced. In-focus regions from all or any portion of the produced images may be combined to produce the in-focus image. Further, since there may be considerable overlap between the in-focus regions of the images, not all of the in-focus region of each of the produced images may be used to produce the in-focus image. In other words, any two or more areas from the in-focus regions of any number of the produced images may be combined to generate the in-focus image.

In certain embodiments, the positions and sizes of the in-focus regions to be combined may be known prior to the production of the images containing those regions. For example, the position of an in-focus region of an image may be determined empirically or calculated using a known formula (e.g., by calculating the depth of field of the imaging system used, and relating the depth of field to the image). In such embodiments, the in-focus regions of the plurality of images may be combined in a pre-determined manner. The number of different images of an area that are required to produce an in-focus image of that area is also readily calculable. For example and with reference to FIG. 2, if depth of field of the imaging system used does not change (i.e., is stable), then the number of images required to produce an in-focus image of an area is readily calculable (in this case, three images are required). Further, since the size and position of in-focus regions 22, 26 and 30, are readily calculable because the depth of field is known, those regions may be combined to make in-focus image 32 in a pre-determined manner (i.e., without any further analysis to identify the in-focus region in each image).

In other embodiments, the positions and sizes of the in-focus regions of the images to be combined may be unknown at the time at which they are produced. In these embodiments, image analysis software may be employed to identify the in-focus regions of the images to be combined. Image analysis methods suitable for use in these embodiments is well known in the art, and includes contrast-based methods (see, e.g., U.S. Pat. No. 6,320,979) and pyramid-based methods (see, e.g., Ogden et al., RCA Engineer 1984 30-5:4-15, Adelson et al, RCA Engineer 1984 29-4-33-41 and U.S. Pat. Nos. 4,797,942, 6,661,986 and 4,498,843, which references are incorporated herein by reference) and other methods that are currently employed in confocal microscopy. Software for performing such image analysis methods may be purchased from a variety of vendors, including Sun Microsystems (Santa Clara, Calif.), and is readily adapted for use herein.

Pyramid-based methods are particularly employable in the instant methods because they may be used to produce two-dimensional and three-dimensional images. Pyramid-based methods may be low pass (or "Gaussian pyramid"-based), or band-pass (or "Laplacian pyramid"-based). Although there are several variations on these methods, such methods may involve blurring a plurality of original images having different in-focus regions to produce a plurality of blurred images, subtracting the blurred images from their corresponding original images to produce a set of images in which "edges" (i.e., defined features) are displayed. The edges indicate the in-focus regions of the original images, and the combination of those in-focus regions produces an image that is fully in-focus. A plurality of consecutive in-focus two-dimensional images may be stacked on top of or next to each other to make an in-focus three-dimensional image, for example.

Pyramid based methods express an image as a sum of spatially bandpassed images while retaining local spatial information in each band. A pyramid may be created by lowpass-filtering an image $G_0$ with a compact two-dimensional filter. The filtered image is then sub-sampled by removing every other pixel and every other row to obtain a reduced image $G_1$. This process is repeated to form a Gaussian pyramid $G_0, G_1, G_2, G_3 \ldots G_n$:

$$G_k(i, j) = \sum_m \sum_n G_{k-1}(2i + m, 2 + n), k = 1, N$$

Expanding $G_1$ to the same size as $G_0$ and subtracting yields the bandpassed image $L_0$. A Laplacian pyramid $L_0, L_1, L_2, \ldots L_{n-1}$, can be built containing bandpassed images of decreasing size and spatial frequency:

$$L_k = G_k - G_{k+1}, k = 0, N-1$$

where the expanded image G is given by:

$$G_{k,l}(i, j) = 4 \sum_m \sum_n G_{k,l-1}[(2i + m/2, 2j + n)/2)] f(m, n)$$

The original image can be reconstructed from the expanded bandpass images:

$$G_0 = L_0 + L_{1,1} + L_{2,2} + \ldots L_{N-1,N-1} + G_{N,N}$$

The Gaussian pyramid contains lowpassed versions of the original $G_0$, at progressively lower spatial frequencies. This effect is can be clearly seen when the Gaussian pyramid levels are expanded to the same size as $G_0$. The Laplacian pyramid contains bandpassed copies of $G_0$. Each Laplacian level contains the edges of a certain size, and spans approximately an octave in spatial frequency.

The images are decomposed into a set of bandpass components before they are merged. A wide transition zone can then be used for the low frequency components, while a narrow zone is used for the high frequency components. In order to have smooth blending, the width of the transition zone in a given band should be about one wavelength of the band's central frequency. The merged bandpass components are then recombined to obtain the final image mosaic.

Let $S_0, S_1, S_2, \ldots S_k$ be a set of K source images. A set of binary mask images $M_0, M_1, M_2, \ldots M_k$ determine how the source images can be be combined. $M_k$ is "1" where source image $S_k$ is valid, and "0" elsewhere. By multiplying $S_k$ 5 $M_k$ and summing over k provides a "cut and paste" composite with step edges. Alternatively, a Laplacian pyramid $L_{k1}$ for each source image, and a Gaussian pyramid $M_{k1}$ for each mask image may be produced. A composite Laplacian pyramid $L_{k1}$ is formed by "cutting and pasting" at each spatial scale by weighting each source pyramid level by its corresponding mask:

$$L_{cl}(i,j) = M_k(i,j) L_{k1}(i,j)$$

The final image is reconstructed from $L_C$ by expanding each level and summing. Smooth blending is achieved because the transition zone in each pyramid level is comparable to a wavelength of the central frequency of that level. Some types of information can be merged in the pyramid node by node and be guided by the node's own value.

In one example, Laplacian pyramids $L_A$ and $L_B$ for two source images are employed. The low frequency levels of these pyramids should have nearly identical values, since changes in focus have little effect on the low frequency components of the image. Changes in focus will affect node values in the pyramid levels where high spatial frequency information is encoded. Corresponding nodes in the two images will generally represent the same feature of the scene, and will differ primarily in attenuation due to blur. The node with the largest amplitude will be in the image that is most nearly in-focus. The "in-focus" image components can be selected node-by-node in the pyramids rather than region-by-region in the original images. A pyramid $L_C$ is constructed for the composite image by setting each node equal to the corresponding node in $L_A$ or $L_B$ that has the larger absolute value:

If:

$$L_{Al}(i,j) > L_{Bl}(i,j)$$

then:

$$L_{Cl}(i,j) = L_{Al}(i,j)$$

else:

$$L_{Cl}(i,j) = L_{Bl}(i,j)$$

The final in-focus image is obtained by expanding and adding the levels of $L_C$.

A variety of methods may be employed to produce a plurality of images having different in-focus regions. These methods may generally involve: a) altering the field of view of the imaging device with respect to an area on the surface of the sample plate (e.g., by moving the sample plate toward and/or away from the imaging device in its x-y plane, by moving the imaging device relative to the sample plate or by moving both the imaging device and the sample plate), b) altering the focus of the imaging device, or c) altering the field of view of the imaging device with respect to an area on the surface of the sample plate and altering the focus of the imaging device, for example. Such methods are readily implemented in a ion source using a motorized sample plate holder and/or focusing means that are commonly employed in other optical equipment (e.g., digital cameras and the like). Exemplary methods are illustrated in FIGS. 3A and 3B.

Figure 3A:
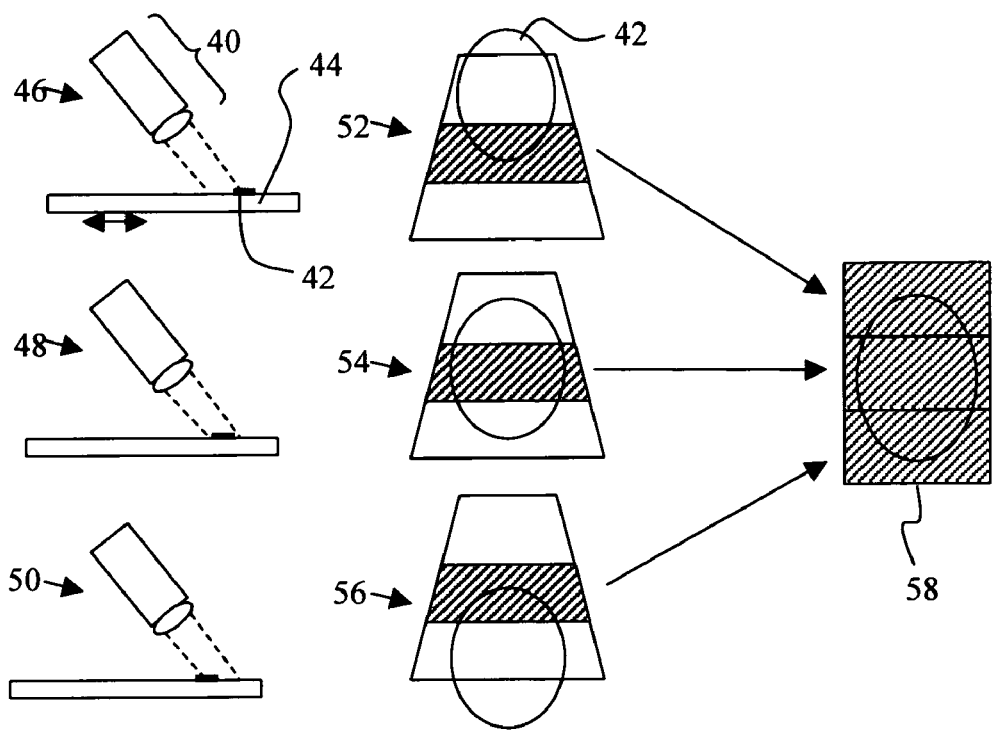
FIG. 3A schematically illustrates a second embodiment of the invention.

In one exemplary embodiment illustrated in FIG. 3A, an imaging device 40 is focused on area 42 of sample pate 44. As indicated by the double-headed arrow, the sample plate may move in the plane of its sample-containing surface, towards and/or away from the imaging device. In this exemplary embodiment, the sample plate is moved towards the imaging device (from right to left in FIG. 3A) and at positions 46, 48 and 50, images of sample area 42 are produced. The images are shown with perspective, as elements 52, 54 and 56, respectively. Area 42 is shown with respect to the field of view of the imaging device (illustrated as trapezoid). The hatched regions of images 52, 54 and 56 represent the in-focus region of those images. The in-focus regions of images 52, 54 and 56 are combined using the methods discussed above to produce in-focus image 58.

Figure 3B:
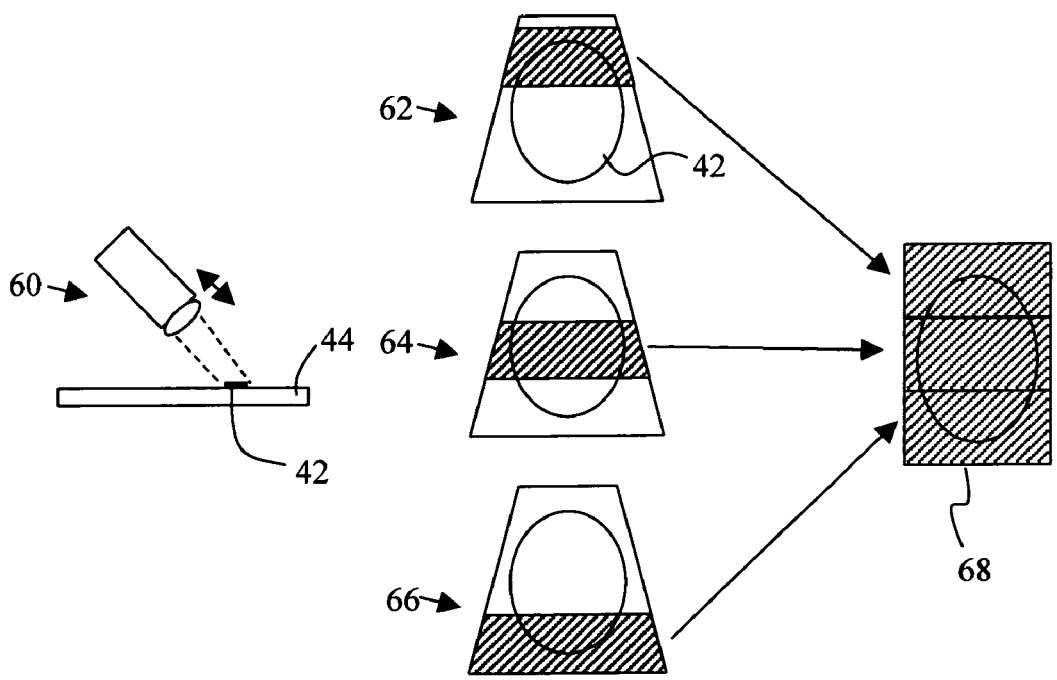
FIG. 3B schematically illustrates a third embodiment of the invention.

In another exemplary embodiment illustrated in FIG. 3B, an imaging device 60 is focused on area 42 of sample pate 44. As indicated by the double-headed arrow, the focus of imaging device 60 may be altered (which, in effect, alters the distance between the objective lens and the area). In this exemplary embodiment, the focus of the imaging device is altered to produce images 62, 64 and 66, each having a different in-focus region. Area 42 is shown with respect to the field of view of the imaging device (illustrated as trapezoid). As would be apparent to one of skill in the art, in this embodiment the field of view is generally fixed and it is the focus of the imaging device that is altered to produce a plurality of images having different in-focus regions. The hatched regions of images 62, 64 and 66 represent the in-focus region of those images. The in-focus regions of images 62, 64 and 66 are combined using the methods discussed above to produce in-focus image 68.

In another embodiment, a combination of the methods illustrated in FIGS. 3A and 3B are employed. In other words, in certain embodiments, a plurality of images is produced by both moving the field of view of the imaging device (e.g., by moving the sample plate and the imaging device relative to each other, for example, by moving the sample plate and/or the imaging device) and altering the focus of the imaging device.

The above methods may be used to produce a two-dimensional or three-dimensional image of an area on a sample plate. Embodiments of the methods in which a plurality of images is produced by both moving the sample plate is moved towards and/or away from the imaging device and altering the focus of the imaging device are particularly employable for making a three-dimensional image. In one exemplary embodiment, a three-dimensional image may be produced by generating a series of two-dimensional images, as discussed above, and employing software to align, i.e., "stack", those images next to one another in order. Such methods are readily adapted from those already employed in confocal microscopy and medical imaging (e.g., magnetic resonance imaging (MRI) or computed tomography scanning (CAT scanning)), for example. In certain embodiments, the three-dimensional image may be stored on computer readable media so that it is accessible by image analysis software. The three-dimensional image may be viewed on a monitor.

In one embodiment, the invention may be employed to produce a three-dimensional image of three-dimensional sample on the surface of a sample plate. Once produced, the three-dimensional image may be examined (e.g., automatically using image analysis software, manually by viewing the image via a monitor or a combination thereof) to identify objects within the sample. In a particular embodiment, the three-dimensional image may be examined to identify a feature of interest (e.g., a crystal) that is present within the three-dimensional sample.

Once a feature of interest is identified, positional information regarding the feature may be generated (e.g., the x, y and z coordinates of the feature with respect to a fixed position on the sample plate) and that positional information may be used to position the feature in the path of the ionizing laser of an ion source. This may be accomplished by moving the sample plate and/or by moving the laser, so that the laser illuminates the feature. Analytes within the feature may be ionized by illuminating the feature with the ionizing laser.

In view of the foregoing, the invention therefore provides a variety of methods for analyzing a three-dimensional sample that is present on the surface of a sample plate. A three-dimensional image of the sample may be produced using the above-described methods, and the above-described methods may be employed to identify and/or ionize features within the sample.

The methods described above may further include correcting any distortions in the in-focus image that may have resulted from imaging the area from the side. For example, geometrical distortions (e.g., perspective distortion) and/or contrast distortion may be corrected to produce an image of an area that appears to have been imaged from directly above the area. Software for performing such corrections is well known in the art.

Computer Readable Media

The invention also provides computer executable instructions (i.e., programming) for performing the above methods. The computer executable instructions are present on a computer readable medium. Accordingly, the invention provides a computer readable medium containing programming for use in producing an in-focus image of an area on a sample plate in an ion source, e.g., a MALDI ion source. The programming includes: instructions for producing a plurality of images of the area having different in-focus regions; and instructions for generating an in-focus image of the area using the images. The instructions may control movement of a sample plate in its x-y plane in a ion source, may controls imaging device focus, and/or may control the timing of image capture. The programming may further include instructions for correcting any distortion of the in-focus image produced by the programming.

The term "computer readable medium" as used herein refers to any storage or transmission medium that participates in providing instructions and/or data to a computer for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external to the computer. A file containing information may be "stored"

on computer readable medium, where "storing" means recording information such that it is accessible and retrievable at a later date by a computer.

With respect to computer readable media, "permanent memory" refers to memory that is permanent. Permanent memory is not erased by termination of the electrical supply to a computer or processor. Computer hard-drive ROM (i.e. ROM not used as virtual memory), CD-ROM, floppy disk and DVD are all examples of permanent memory. Random Access Memory (RAM) is an example of non-permanent memory. A file in permanent memory may be editable and re-writable.

In one embodiment, the computer readable medium is memory of a computer. In another embodiment, the computer readable medium is a portable storage device such as a CD-ROM or the like.

Ion Sources

The invention generally provides a system for producing an in-focus image of an area of a sample plate for an ion source, e.g. a matrix-based ion source. The system generally contains a matrix-based ion source containing an imaging device for imaging a sample plate. In the system, the imaging device is operably linked to a computer containing the above-described computer-readable medium. As discussed above, the computer readable medium generally contains instructions for producing a plurality of images of an area having different in-focus regions; and instructions for generating an in-focus image of the area using the images.

The ion source, during operation, may have an ambient pressure of at least 100 mTorr (e.g., atmospheric pressure) or less than 100 mTorr (and, in certain embodiments may be an atmospheric pressure, vacuum or intermediate vacuum MALDI ion source). The imaging device is generally within the ion source, and directed toward (via any mirrors and/or other optical components) the area to be imaged. The ion source may further include an illumination device, e.g., a light bulb within the ion source or a fiber-optic illuminator having a light source outside of the ion source, for illuminating the area. The imaging device may be connected to a display, e.g., a video monitor, for viewing the in-focus image of the area. The area of the sample plate imaged may contain the impact point of the laser on the sample plate, and the area may also contain deposited sample.

Figure 4:
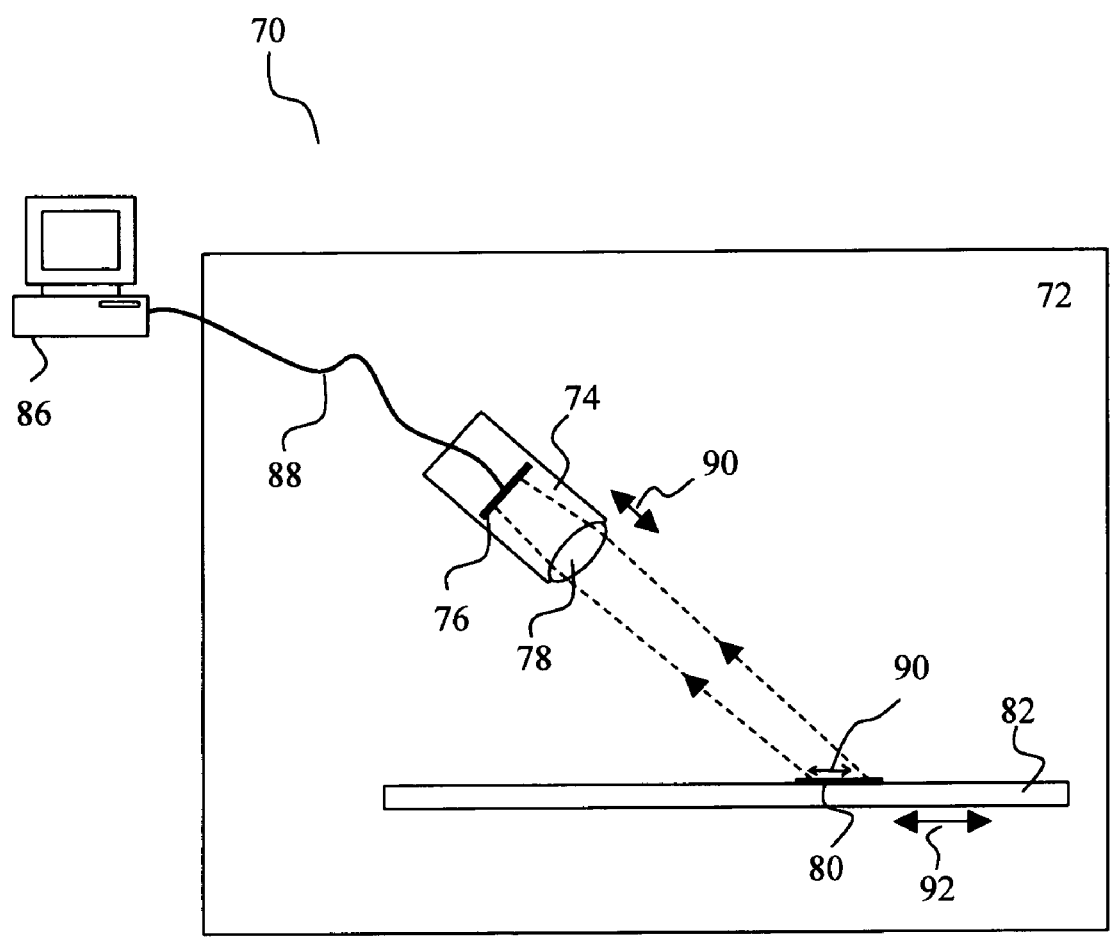
FIG. 4 schematically illustrates a first exemplary ion source of the invention.
Figure 5:
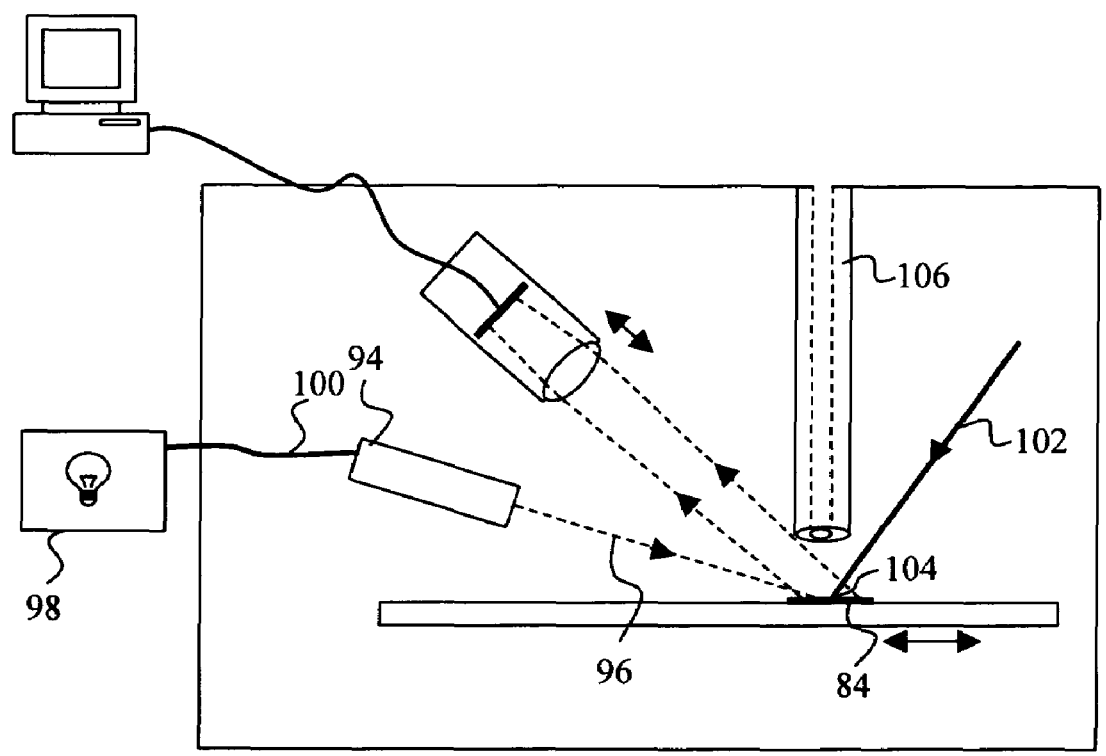
FIG. 5 schematically illustrates a second exemplary ion source of the invention.

An exemplary system is schematically illustrated in FIG. 4. With reference to FIG. 4, an exemplary system 70 contains an ion source 72 containing an imaging device 74. The imaging device generally contains an array of photosensors (e.g., an array of pixels) 76 and an objective lens (that may also be known as an "imaging" lens) 78. The imaging device 74 produces an image of area 80 on a sample plate 82 within the ion source. The field of view of the imaging device is illustrated in FIG. 5 as element 84. The imaging device is connected to a computer 86 that contains the above-described programming. A cable 88 may connect the imaging device to the computer.

Imaging device 74 may be any type of camera, although a camera that provides a digitized output (i.e., a digital camera) is most readily employed. In certain embodiments, the camera employed may be a charged-coupled device (CCD) or complementary metal-oxide-semiconductor (CMOS) camera. As noted above, such imaging devices generally contain an array of photosensors. The array may be oriented at any angle with respect to the light entering the imaging device. In one embodiment, the photosensor array may be oriented in a direction that is generally perpendicular (i.e., within 1° of perpendicular) to the light entering the imaging device, ensuring high resolution and contrast. In certain embodiments, the imaging device may be focusable (as illustrated by double headed arrow 90), and the focus of the imaging device may be controlled by the instructions of computer 86. In other embodiments and as illustrated by double-headed arrow 92, the sample plate may be moveable in its x-y plane (i.e. in the plane of its sample-containing surface) towards and/or away from the imaging device. The movement of the sample plate towards and/or away from the imaging device may be controlled by the instructions of computer 86. The instructions of computer 86 may generally control several aspects of the system, e.g., the focus imaging device 74 and/or movement of sample plate 92, the timing at which images are captured by imaging device 74, and how many images are produced for each area. Once a plurality of images are produced by the system, the computer uses those images to produce an in-focus image using the methods described above, and displays the image (which image may be a two-dimensional or three-dimensional image) on a display. The impact point of the ionizing laser may also be shown on the display. In one embodiment illustrated in FIG. 5, the invention provides a system containing the elements shown in FIG. 4, as well as an illumination device 94 for illuminating area 80 in light 96. In certain embodiments, the illumination device may be connected to a light source 98 (e.g., a halogen or LED lamp) that is exterior to the ion source, via a light guide (e.g., a fiber optic light guide) 100. The ion source may also contain ionizing laser 102 directed to laser impact point 104 that is within area 80. The ion source may also contain ion exit capillary 106 positioned above laser impact point 104 for transporting ions out of the ion source. The ion source may also contain X-Y stages to move the plate.

In certain embodiments, the area may be illuminated using the grazing angle illumination system described in co-pending U.S. patent application entitled "ION SOURCE SAMPLE PLATE ILLUMINATION SYSTEM" and filed on Jun. 8, 2005, which patent application is incorporated herein in its entirety for all purposes.

The in-focus image produced using the system described above may be employed for a number of purposes. In one embodiment, the image is used to ensure that the ionizing laser will impact a desired region on the surface of the sample plate. Accordingly, in view of the above, the invention further provides a method of ionizing a sample. The method generally involves: positioning a sample in a field of view of a imaging device; producing a plurality of images of a sample having different in-focus regions; generating an in-focus image of the sample using the images; positioning the sample plate such that the ionizing laser of the ion source will impact the sample, and ionizing the sample.

Mass Spectrometer Systems

Figure 6:
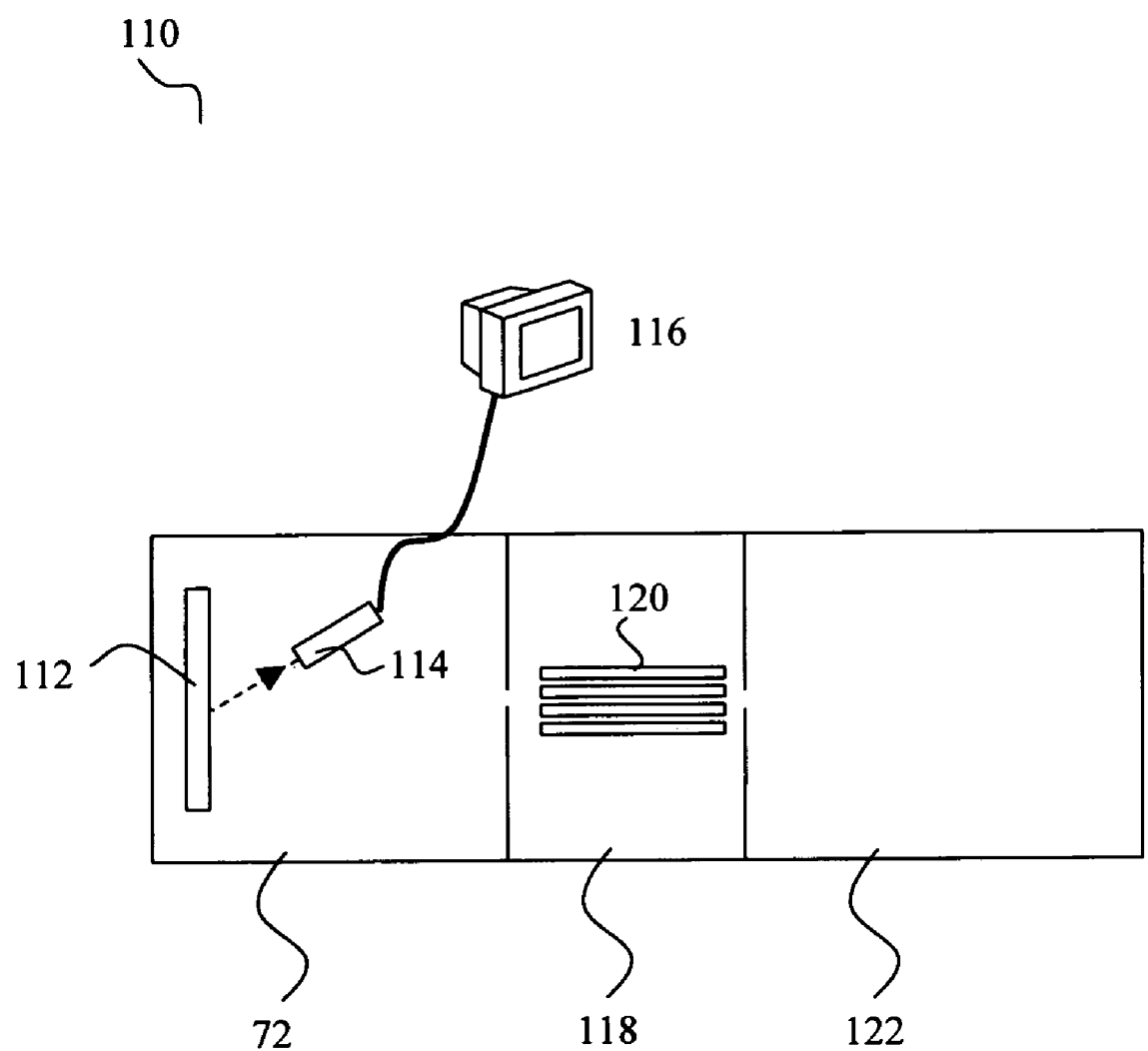
FIG. 6 schematically illustrates a mass spectrometry system of the invention.

The invention also provides a mass spectrometer system containing an above-described system for producing an in-focus image of an area of a sample plate. Mass spectrometer systems containing ion sources are generally well known in the art and therefore do not need be described in any great detail herein. In general terms, the mass spectrometer system contains an ion source and a mass analyzer containing an ion detector, connected by one or more intermediate chambers. An exemplary mass spectrometer system of the invention is shown in FIG. 6. As is conventional in the art, the ion source 72 and the mass analyzer are separated by at least one intermediate vacuum 118 chamber through which ions are transported after they have exited the ion source via an ion exit capillary. One or more vacuum stages may be employed depending on the requirements of the system. As discussed in great detail above, computer 116 processes images produced by imaging device 114 to produce an in-focus image of an area of sample plate 112.

Mass analyzer and detector 122 may comprise a quadrupole, triple quadrupole, three dimensional ion trap, linear ion trap, time-of-flight (TOF), magnetic sector, Fourier transform ion-cyclotron resonance (FTICR), or other mass to charge analyzer known in the art, for example.

In use, if ion source 72 is held at atmospheric pressure, intermediate chamber 118 is held at a pressure that is around two orders of magnitude less than the ambient pressure, and mass analyzer 122 is held at a pressure of around two to four orders of magnitude less than that of the intermediate chamber. The ions exit ion source 72 via its ion collection capillary and are swept into the vacuum chamber 118, usually via a skimmer, in a stream of gas due to the pressure difference between ion source 72 and chamber 118. The ions pass through chamber 118 (and any ion guide 120, ion beam shaping or focusing lenses that may be present) and enter mass analyzer 122. Mass analyzer 122 determines the m/z ratio of the ions, and thus is useful for determining molecular weights of analytes in the sample. Ion guide 120 may be a multipole ion guide, a segmented multipole ion guide, a sequential disk RF ion guide, an ion funnel or other ion guide known in the art. Ion guide 120 may extend continuously into one or more vacuum pumping stages or may begin and end in a single vacuum stage.

Utility

The methods described above generally provide a high-resolution, in-focus image of an area of a sample plate for an ion source. The in-focus image generally shows detailed structure of features within the imaged area, and sample-containing areas, areas containing analyte crystals, and other structures may be readily discerned. The in-focus image produced by the method described above may be employed in a variety of different ways.

For example, in one embodiment, the method may be employed to produce a two-dimensional or three-dimensional image of an area of a sample plate, and show that image on a display, e.g., a monitor. In certain embodiments, the laser impact point (i.e., the point of impact of the ionizing laser of a ion source on the surface of a sample plate) of the ion source may also be shown on the display. The position of a sample-containing area of a sample plate may therefore be viewed in relation to the point of impact of the ionizing laser on the sample plate, and the position of the sample plate can be adjusted accordingly (e.g., manually or using software) to ensure that the laser impacts a sample-containing area (or any feature of a sample-containing area) when fired.

In this embodiment, the area of the sample plate can be imaged prior to, during or after ionization of a sample in the illuminated area. Further, the sample plate can be moved in the plane of the surface of the sample plate (i.e., in the x-y plane) as the sample plate is being imaged, allowing an operator to identify areas would be desirable to ionize (e.g., sample-containing areas or crystal-containing areas within a sample-containing area), and direct an ionizing laser at those areas without undue effort.

In another embodiment, for example, the image may be analyzed, and sample parameters describing the two-dimensional or three-dimensional shapes, dimensions and locations of samples on the sample plate may be determined (either manually or using software). The sample parameters for a plate may be stored in a file, in memory, and used by ion source to direct a laser to a sample-containing area on that sample plate. Such methods are generally described in great detail in co-pending U.S. patent application Ser. No. 10/429,234, filed on May 2, 2003 and published as US20040217278, which patent application is incorporated herein in its entirety for all purposes.

In an embodiment of particular interest, the subject methods are employed in so called "imaging mass spectrometry" methods in which a biological sample, which may be, for example, a single cell or a tissue section, is fixed on a sample plate for a matrix-based ion source. The sample may be made by any means available, including sectioning or laser capture microdissection. Matrix is added to the sample, and the sample may be stained using a matrix-compatible stain. An in-focus image of the sample produced by the methods of the invention may generally be of sufficient detail (i.e., may be of sufficiently high resolution) to allow particular areas of a sample to be identified and ionized. For example, the in-focus image may show an area of staining, an area of non-staining, an organelle, a cell, a cell-type, or a particular area of a section that is of interest. That area may be ionized using the methods described above, to provide information regarding the masses of the molecules, e.g., polypeptides, in that area. In alternative embodiments, areas of the sample may be ionized arbitrarily (e.g., at random) and the mass profiles obtained from those areas may be correlated with structures identified on the image. Details of imaging mass spectrometry methods are found in a variety of publications, including, but not limited to: Rubakhin et al (Anal. Chem. 2003 75:5374-5380); Chaurand et al (Anal. Chem. 2004 76:1145-1155); Stoeckli et al (Nat. Med. 2001 7:493-496), Masumori et al (Cancer Res. 2001 61:2239-2249), Chaurand et al (Proteomics 2001 1: 1320-1236) and Palmer-Toy et al (Clin. Chem 2000 46:1513-1516), which publications are incorporated by reference herein. Such methods may be employed to investigate normal and diseased cells, including cancer and diseased cells, for example.

Figure 7:
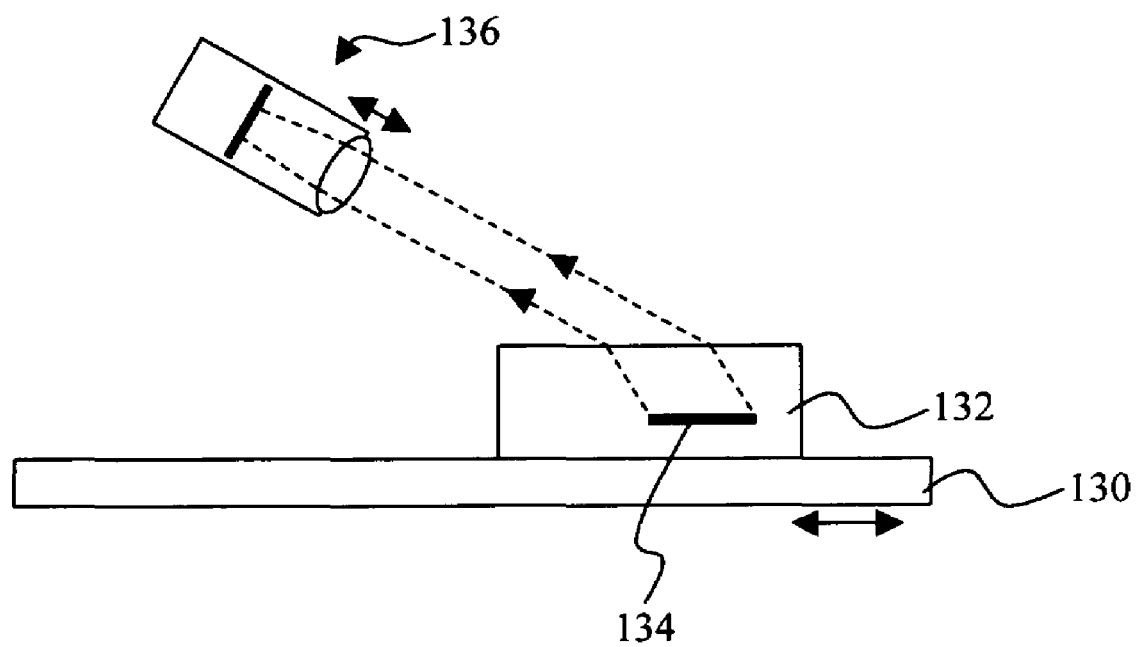
FIG. 7 shows a fourth embodiment of the invention.

In a further embodiment and as illustrated in FIG. 7, the method of the invention may be used to produce a two-dimensional or three-dimensional high resolution image of an object that is contained within a three-dimensional light transparent sample, e.g., an embedded sample), that is present on the surface of a sample plate. The object may be identified using the methods of the invention, and the object may be moved under the laser of the ion source and ionized. As illustrated in FIG. 7, imaging device 136, in combination with the methods described above, is used to produce an in-focus image of an object 134 that is present within a three dimensional transparent substrate 132 that is present on sample plate 130.

The invention generally finds use in methods of sample mass analysis, where a sample may be any material deposited and crystalized onto the surface of a sample plate or mixture of materials. Samples typically contain one or more components of interest. Samples may be derived from a variety of sources such as from foodstuffs, environmental materials, a biological sample such as tissue or fluid isolated from a subject (e.g., a plant or animal subject), including but not limited to, for example, plasma, serum, spinal fluid, semen, lymph fluid, the external sections of the skin, respiratory, intestinal, and genitourinary tracts, tears, saliva, milk, blood cells, tumors, organs, and also samples of in vitro cell culture constituents (including but not limited to conditioned medium resulting from the growth of cells in cell culture medium, putatively virally infected cells, recombinant cells, and cell components), or any biochemical fraction thereof.

Kits

Kits for use in connection with the invention are also provided. Such kits include any of the compositions, including a computer-readable medium or a focusable imaging device, as discussed above. The kit may also contain instructions for retrofitting a matrix-based ion source with the imaging device, or instructions for performing any of the above methods, where the instructions are typically present on a substrate, e.g., one or more sheets of paper, associated with the kit.

Instructions for practicing the methods are generally recorded on a suitable recording medium. For example, the instructions may be printed on a substrate, such as paper or plastic, etc. As such, the instructions may be present in the kits as a package insert, in the labeling of the container of the kit or components thereof (i.e., associated with the packaging or subpackaging) etc. In other embodiments, the instructions are present as an electronic storage data file present on a suitable computer readable storage medium, e.g. CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

EXPERIMENTAL

The following examples are put forth so as to provide those of ordinary skill in the art with a description of how to make and use some embodiments of the present invention, and are not intended to limit the scope of what the inventors regard as their invention.

EXAMPLE 1

The following methods used three individual images of an AP-MALDI sample plate. An AP-MALDI sample plate was positioned inside an AP-MALDI ion source. The images were captured using a black and white CCD camera and sent to a program for displaying images on personal computer. The plate was moved via cursor buttons using a program that controlled the location of the spot (via controlling the motorized stages).

A first image was taken in which the left-most section of a deposited sample was in focus (see FIG. 8A). The sample plate was re-positioned and a second image was taken in which the center area of the spot was in focus (see FIG. 8B). The sample plate was re-positioned and a second image was taken in which the right-most section of the spot was in focus (see FIG. 8C).

On a personal computer, using standard image analysis software PAINTSHOP PRO™, all three images were visually inspected. The portions of the spot that were deemed to be in focus were combined by copy and paste to produce an image in which the sample is entirely in focus. The final in-focus image is shown in FIG. 8D.

The final image was then fed into another program running on a personal computer, which is used to automatically detect spot locations. This program was then able to find the exact center location of the spot, something the same program could not accomplish with an image that is not completely in focus.

It is evident from the above results and discussion that the invention provides an important means for producing an in-focus image of a sample in an sample plate. Accordingly, the present invention represents a significant contribution to the mass spectrometry arts.

All publications and patents cited in this specification are herein incorporated by reference as if each individual publication or patent were specifically and individually indicated to be incorporated by reference. The citation of any publication is for its disclosure prior to the filing date and should not be construed as an admission that the present invention is not entitled to antedate such publication by virtue of prior invention.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method of producing an in-focus image of an area on a sample plate for a matrix-based ion source, comprising:
   positioning said area in a field of view of an imaging device;
   producing a first image having an in-focus region and an out-of-focus region using said imaging device
   producing a second image having an in-focus region and an out-of-focus region using said imaging device, and
   generating a final in-focus image using said in-focus regions of said first and second images.

2. The method of claim 1, wherein said methods comprises producing more than two images having in-focus regions.

3. The method of claim 1, wherein said final in-focus image comprises a plurality of said in-focus regions.

4. The method of claim 1, wherein said first image and said second image are produced by altering the position of said imaging device relative to said area.

5. The method of claim 4, wherein said field of view is altered by moving said sample plate in the plane of its surface.

6. The method of claim 4, wherein said method comprises by altering the focus of said imaging device.

7. The method of claim 4, wherein said method comprises: moving said sample plate relative to said imaging device; and altering the focus of said imaging device.

8. The method of claim 1, wherein said final in-focus image is a two-dimensional image.

9. The method of claim 1, wherein said final in-focus image is a three-dimensional image.

10. The method of claim 1, wherein a pre-determined number of images are combined to produce said final in-focus image.

11. The method of claim 1, wherein images of said first image and said second image are combined together at pre-determined locations to produce said final in-focus image.

12. The method of claim 1, wherein in-focus regions of said first image and said second image are selected using image analysis software and combined to produce said final in-focus image.

13. The method of claim 1, further comprising displaying said final in-focus image on a display.

14. A method of ionizing a sample on a sample plate in a matrix-based ion source, comprising:

positioning said sample in a field of view of an imaging device;
producing a first image having an in focus region and an out of focus region using said imaging device;
producing a second image having an in focus region and an out of focus region using said imaging device
generating a final in-focus image of said sample using said in focus regions of said first and said second images; and
ionizing said sample.

15. The method of claim 14, further comprising moving said sample plate in said matrix-based ion source so that said sample can be ionized.

16. A computer readable medium containing programming for use in producing an in-focus image of an area in an matrix-based ion source, comprising:
instructions for producing a plurality of images of said area having different in-focus regions; and
instructions for generating an in-focus image of said area using said images.

17. The computer readable medium of claim 16, wherein said instructions move the imaging device relative to said area.

18. The computer readable medium of claim 16, wherein said instructions alter the focus of said imaging device.

19. The computer readable medium of claim 16, further comprising instructions for correcting any geometrical distortion of said in-focus image.

20. The computer readable medium of claim 16, further comprising instructions for correcting any contrast differences in said in-focus image.

21. A system for producing an in-focus image of an area of a sample plate, said system comprising:
a matrix-based ion source comprising an imaging device; and
a computer comprising programming comprising:
instructions for producing a plurality of images of said area having different in-focus regions; and
instructions for generating an in-focus image of said area using said plurality of images.

22. The system of claim 21, further comprising a display connected to said imaging device.

23. A mass spectrometry system comprising:
a matrix-based ion source comprising an imaging device;
an ion transport device operably linked to said matrix-based ion source;
a mass spectrometer linked to said ion transport device; and
a computer comprising programming comprising:
instructions for producing a plurality of images of an area of a sample plate having different in-focus regions; and
instructions for generating an in-focus image of said area using said plurality of images.

24. The mass spectrometry system of claim 23, wherein said mass spectrometer is a single quadrupole, triple quadrupole, two-dimensional ion trap, three-dimensional ion trap, time-of-flight (TOF), magnetic sector or Fourier transform ion-cyclotron resonance (FTICR) mass spectrometer.

25. The mass spectrometry system of claim 23, wherein said matrix-based ion source is a MALDI ion source.

26. The mass spectrometry system of claim 23, wherein said MALDI ion source is operated at a pressure of at least 100 mTorr.

27. The mass spectrometry system of claim 23, wherein said MALDI ion source is operated a pressure of less than 100 mTorr.

* * * * *

UNITED STATES PATENT AND TRADEMARK OFFICE
CERTIFICATE OF CORRECTION

PATENT NO.        : 7,365,310 B2
APPLICATION NO.   : 11/168612
DATED             : April 29, 2008
INVENTOR(S)       : Truche et al.

It is certified that error appears in the above-identified patent and that said Letters Patent is hereby corrected as shown below:

In column 18, line 1, in Claim 21, after "computer" delete "comprising".

In column 18, line 15, in Claim 23, after "computer" delete "comprising".

In column 18, line 32, in Claim 27, after "operated" insert -- at --.

Signed and Sealed this

Twenty-first Day of April, 2009

JOHN DOLL
*Acting Director of the United States Patent and Trademark Office*